(12) United States Patent
Byrne

(10) Patent No.: US 9,140,575 B2
(45) Date of Patent: Sep. 22, 2015

(54) NAVIGATING TO A SELECTED LOCATION

(75) Inventor: Paul Vincent Byrne, Los Altos, CA (US)

(73) Assignee: Google Inc., Mountain View, CA (US)

( * ) Notice: Subject to any disclaimer, the term of this patent is extended or adjusted under 35 U.S.C. 154(b) by 477 days.

(21) Appl. No.: 13/487,077

(22) Filed: Jun. 1, 2012

(65) Prior Publication Data

US 2013/0325345 A1     Dec. 5, 2013

(51) Int. Cl.
     *G01C 21/36*        (2006.01)

(52) U.S. Cl.
     CPC .......... *G01C 21/3688* (2013.01); *G01C 21/362* (2013.01)

(58) Field of Classification Search
     CPC .......................... G01C 21/362; G01C 21/3688
     USPC ......... 701/400, 408, 409, 410, 420, 428, 430, 701/431, 461, 468, 484, 485, 487, 517, 522, 701/526, 532, 533, 537, 538, 540, 541, 200, 701/201, 207, 208, 209, 211, 213
     See application file for complete search history.

(56) References Cited

U.S. PATENT DOCUMENTS 8,055,440 B2 * 11/2011 Shintani et al. ............... 701/420
8,762,059 B1 * 6/2014 Balogh ......................... 701/533
2008/0154498 A1 6/2008 Huang
2011/0018759 A1 * 1/2011 Bennett et al. ............. 342/357.4
2012/0053787 A1 3/2012 Shintani et al.

FOREIGN PATENT DOCUMENTS

EP     1 855 087 A2     11/2007

OTHER PUBLICATIONS

Garmin. Using MapQuest site with your Garmin GPS device. https://www.youtube.com/watch?v=suQ6nJt84AA. Uploaded on Apr. 23, 2008.*

* cited by examiner

*Primary Examiner* — Khoi Tran
*Assistant Examiner* — Robert Nguyen
(74) *Attorney, Agent, or Firm* — Dority & Manning, P.A.

(57) ABSTRACT

The disclosed subject matter relates to computer-implemented methods for navigating to a selected location. One method includes receiving from a client device, which includes a graphical user interface, a search query for locations. The method includes performing a search using the search query to obtain one or more locations corresponding to the search query. The method includes sending to the client device, for display on the graphical user interface, the one or more locations corresponding to the search query. The method includes receiving from the client device, an indication of a selected location which corresponds to one of the location or locations corresponding to the search query. The method includes calculating navigation instructions for the secondary device to navigate to the selected location. The method includes sending to the client device, the navigation instructions for the secondary device, and a request to forward the navigation instructions to the secondary device.

19 Claims, 6 Drawing Sheets

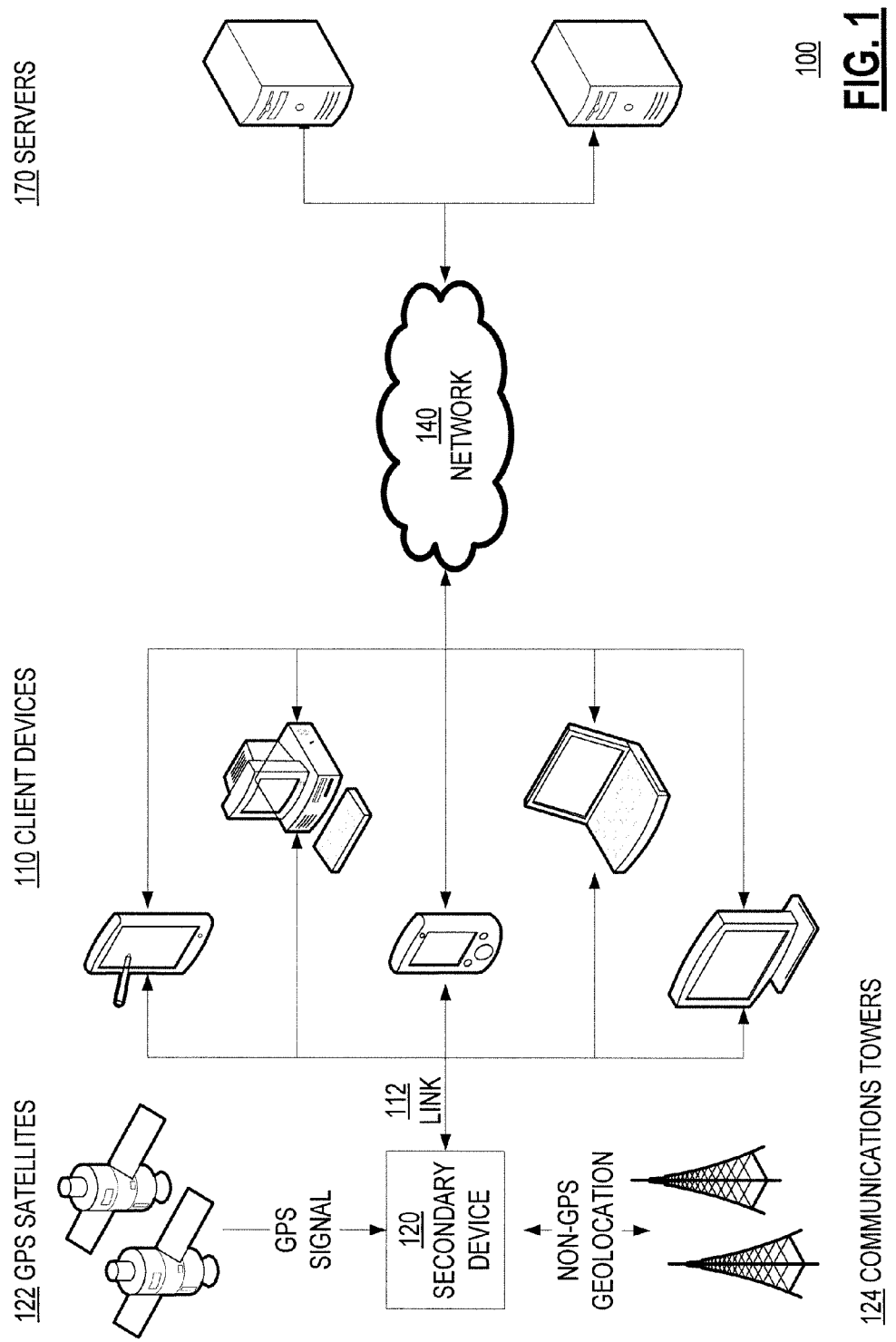

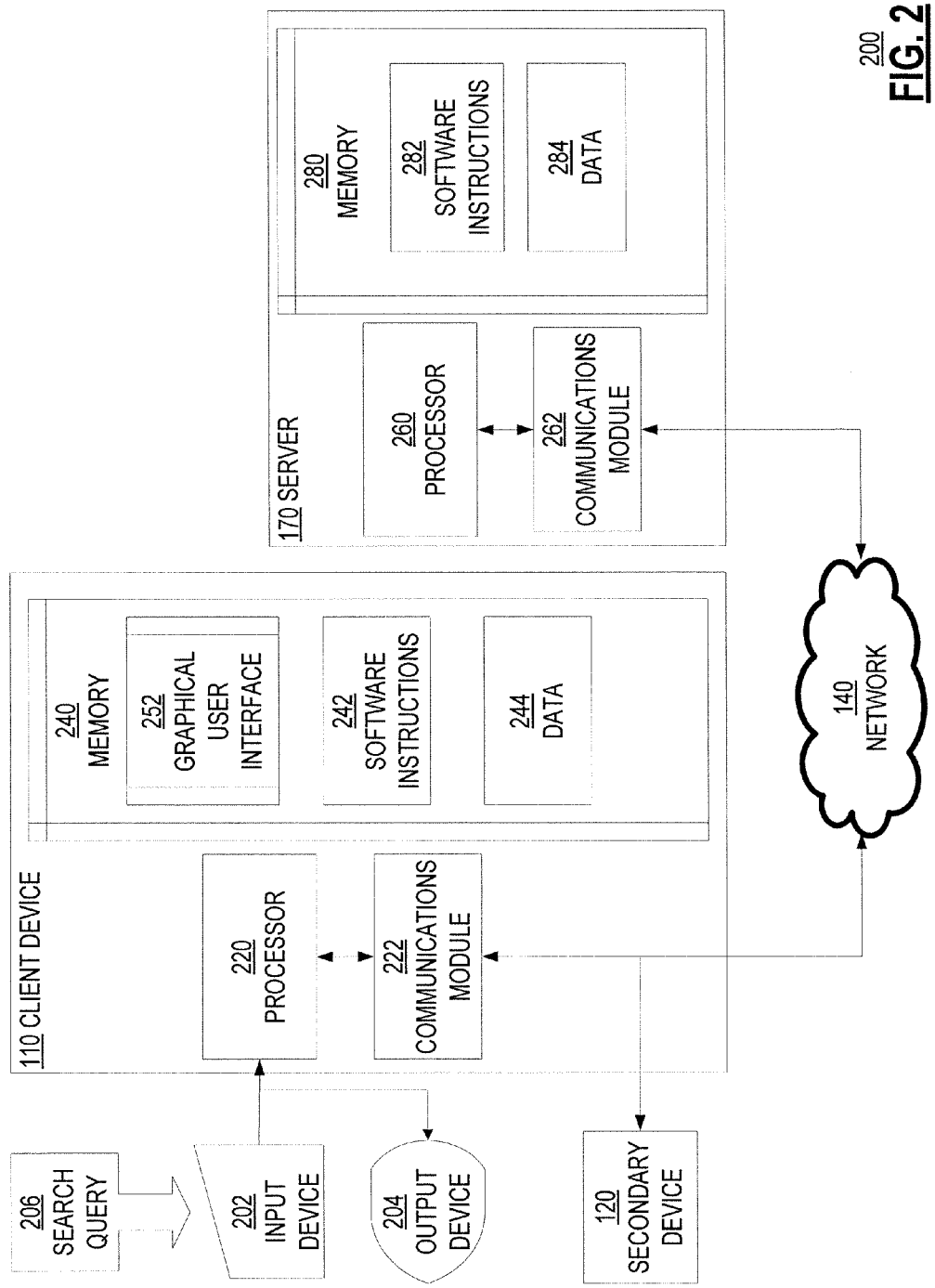

NAVIGATING TO A SELECTED LOCATION

BACKGROUND

1. Field

The present disclosure generally relates to navigating to a selected location, and more particularly to interactively using a client device to navigate to a selected location.

2. Description of the Related Art

Devices with Global Position System ("GPS") capabilities can be used to obtain directions. For example, automobiles may offer built-in GPS-based navigation devices. Consumers who do not have a factory-fitted GPS-based navigation device in their automobiles may utilize after-market GPS devices. In addition to use in automobiles, hand-held GPS devices can be used to obtain directions. Computing devices such as laptops, smartphones, and tablet computers may also offer GPS capabilities.

Many devices with GPS capabilities offer the ability to conduct searches. For example, a device with GPS capabilities may allow a consumer to search specifically for a particular location or generally for locations by a category. Once a search query is submitted, the device with GPS capabilities typically presents to the consumer, locations nearest to the device's current location.

SUMMARY

The disclosed subject matter relates to a computer-implemented method for providing navigational instructions for a secondary device. The method includes receiving from a client device, which includes a graphical user interface, a search query for locations. The method further includes performing a search using the search query to obtain one or more locations corresponding to the search query. The method includes sending to the client device, for display on the graphical user interface, the one or more locations corresponding to the search query. The method further includes receiving from the client device, an indication of a selected location which corresponds to one of the location or locations corresponding to the search query. The method includes calculating navigation instructions for the secondary device to navigate to the selected location. The method further includes sending to the client device, the navigation instructions for the secondary device, and a request to forward the navigation instructions to the secondary device.

The disclosed subject matter further relates to a system for providing navigational instructions for a secondary device. The system includes a memory which includes instructions for providing navigational instructions for a secondary device, and a processor. The processor is configured to execute the instructions to receive a search query for locations from the client device. The client device, which includes a graphical user interface, is operatively connected to the secondary device via an information sharing link. In response to receiving the search query, the processor is configured to perform a search using the search query to obtain one or more locations corresponding to the search query. The processor is configured to send to the client device, for display on the graphical user interface, the one or more locations corresponding to the search query. The processor is further configured to receive from the client device, an indication of a selected location which corresponds to one of the location or locations corresponding to the search query. The processor is configured to calculate navigation instructions for the secondary device to navigate to the selected location. The processor is further configured to send to the client device, the navigation instructions for the secondary device, and a request to forward the navigation instructions to the secondary device.

The disclosed subject matter further relates to a machine-readable medium including machine-readable instructions for causing a processor to execute a method for providing navigation instructions for a secondary device. The method includes receiving from a client device, a search query for locations. The client device includes a graphical user interface. The client device is operatively connected to a secondary device via a wired information sharing link or a wireless information sharing link. The method further includes performing a search using the search query to obtain one or more locations corresponding to the search query. The method includes sending to the client device, for display on the graphical user interface, the one or more locations corresponding to the search query. The method further includes receiving from the client device, an indication of a selected location which corresponds to one of the location or locations corresponding to the search query. The method includes calculating navigation instructions for the secondary device to navigate to the selected location. The method further includes sending to the client device, the navigation instructions for the secondary device, and a request to forward the navigation instructions to the secondary device.

The disclosed subject matter further relates to a computer-implemented method for providing a selected location to a secondary device. The method includes receiving, via a graphical user interface, a search query for locations. The method further includes sending the search query for locations to a server. The method further includes receiving from the server, for display on the graphical user interface, one or more locations corresponding to the search query. The method includes receiving a selection of a location which is selected, via the graphical user interface, from the one or more locations corresponding to the search query. The method includes sending the selected location to a secondary device which is configured to calculate a route to the selected location.

The disclosed subject matter further relates to a system for providing a selected location to a secondary device. The system includes a memory which includes instructions for providing a selected location to a secondary device, and a processor. The processor is configured to execute the instructions to receive, via a graphical interface, a search query for locations. The processor is further configured to send the search query for locations to a server. The processor is further configured to receive from the server, for display on the graphical user interface, one or more locations corresponding to the search query. The processor is configured to receive a selection of a location which is selected, via the graphical user interface, from the one or more locations corresponding to the search query. The processor is further configured to send via an information sharing link, the selected location to a secondary device which is configured to calculate a route to the selected location.

The disclosed subject matter further relates to a machine-readable medium includes machine-readable instructions for causing a processor to execute a method for providing a selected location to a secondary device. The method includes receiving, via a graphical user interface, a search query for locations. The method further includes sending to a server, the search query for locations. The method further includes receiving from the server, for display on the graphical user interface, one or more locations corresponding to the search query. The method includes receiving a selection of a location which is selected from the one or more locations corresponding to the search query. The method further includes sending the selected location to a secondary device which is configured to calculate a route to the selected location. The selected location is sent to the secondary device via a wired information sharing link or a wireless information sharing link.

BRIEF DESCRIPTION OF THE DRAWINGS

The accompanying drawings, which are included to provide further understanding and are incorporated in and constitute a part of this specification, illustrate implementations of the disclosed subject matter and together with the description serve to explain the principles of the disclosed implementations. In the drawings:

FIG. 1 illustrates an example of an architecture for providing navigational instructions for a secondary device, and/or for providing a selected location to a secondary device.

FIG. 2 is a block diagram illustrating an example of a client device and server from the architecture of FIG. 1 according to certain aspects of the disclosure.

DETAILED DESCRIPTION

Figure 3A:
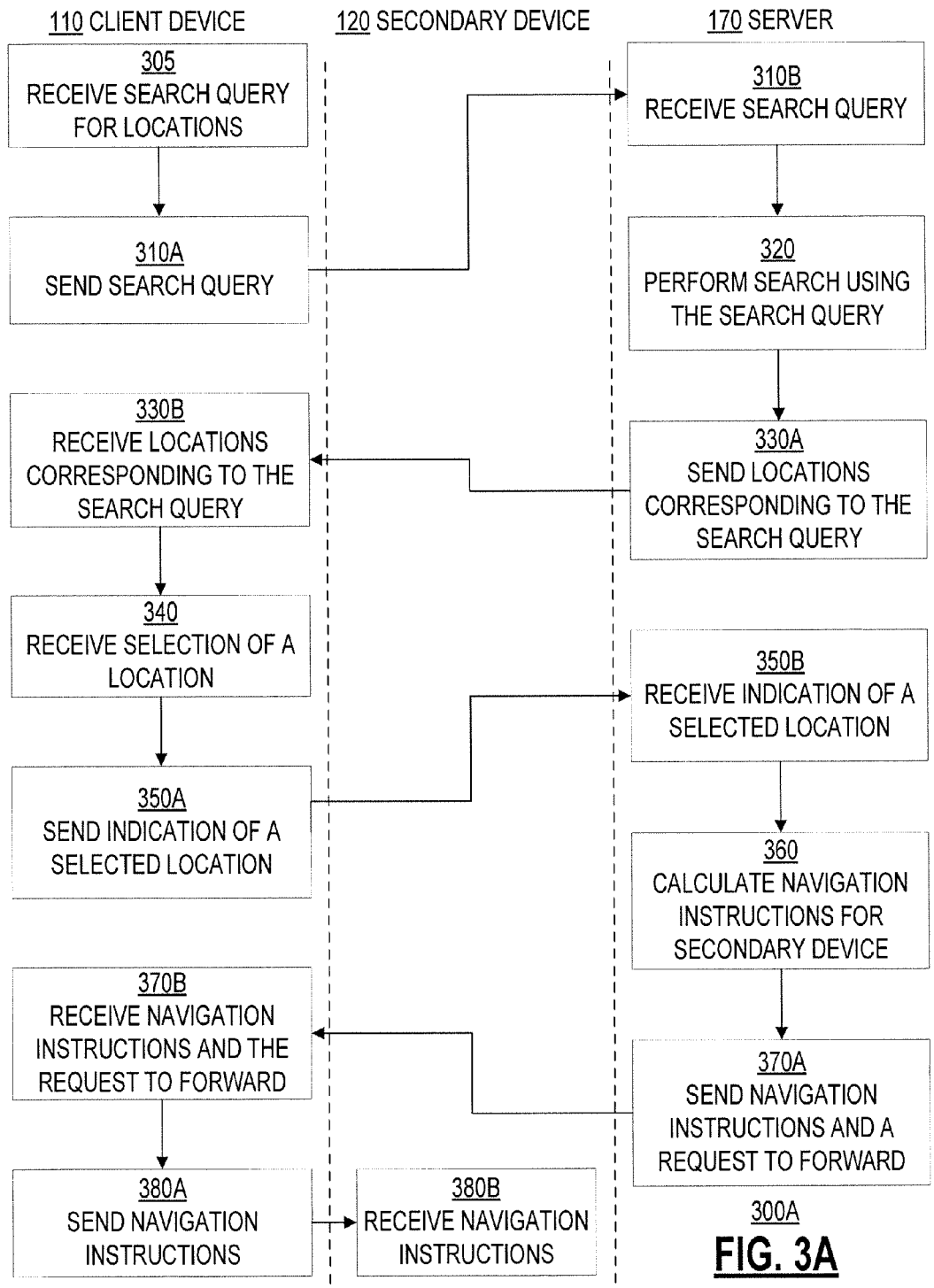
FIG. 3A illustrates an example of a process for providing navigational instructions for a secondary device.

In the following detailed description, numerous specific details are set forth to provide a full understanding of the present disclosure. It will be apparent, however, to one ordinarily skilled in the art that the implementations of the subject matter of the present disclosure may be practiced without some of these specific details. In other instances, well-known structures and techniques have not been shown in detail so as not to obscure the disclosure.

Existing GPS devices do not take into account, disruption to a consumer's travel path. For example, in response to a search query, a device with GPS capabilities may suggest a location that may be near the user's current location, but may be in a direction away from the consumer's destination. Furthermore, when using existing GPS devices, consumers must input their search queries and subsequent responses to prompts via an interface on the device. In the context of an automobile, such a distraction presents a hazard to the safety of the consumer and others.

The disclosed system and method enables providing navigational instructions for a secondary device. In addition, or as an alternative, the disclosed system and method enables providing a selected location to a secondary device. Once the system is configured, a user can search for locations using a client device. The client device can be for example a smartphone, a tablet computer, a laptop, or any other computing device.

For example, a user can use a smartphone to search for pizza restaurants by entering a search query (e.g., "pizza") into the system using his smartphone. Upon receiving the search query, a search is performed using the search query (e.g., "pizza") to obtain one or more locations corresponding to the search query. The one or more locations corresponding to the search query are sent to the user's smartphone. The user can then select a location from the one or more locations. The selected location (e.g., "Joe's Pizza') is received by the system. Upon receiving the user's selection, navigation instructions (e.g., directions to Joe's pizza) for a secondary device are sent to the user's smartphone.

As an alternative, the selected location can be provided to the secondary device for calculating navigation instructions. For example, the selected location can be provided to the secondary device directly from the user's smartphone.

FIG. 1 illustrates an example of an architecture for providing navigational instructions for a secondary device, and/or for providing a selected location to a secondary device. The architecture 100 includes client devices 110 and servers 170 connected over a network 140.

As illustrated, the client devices 110 can be, for example, desktop computers, mobile computers, tablet computers, mobile devices (e.g., a smartphone or PDA), set top boxes (e.g., for a television), video game consoles, or any other devices having appropriate processing capabilities, communications capabilities, and memory. Each client device 110 can be configured to be capable of establishing an information sharing link 112 with a secondary device 120.

The secondary device 120 can be a computing device similar to the examples provided above for client devices 110. The secondary device 120 can be a navigational device such as, for example, a hand-held GPS device or a GPS unit installed in a car. The secondary device 120 may be location-aware. The phrase "location-aware device" as used herein encompasses its plain and ordinary meaning, including, but not limited to any device which is capable of determining its current location. For example, a device capable of determining its location based on a GPS signal received from GPS satellites 122 can be a location-aware device. A location-aware device may also be able to determine or estimate its location using non-GPS techniques such as, for example, IP geolocation. Another non-GPS technique may rely on connecting to communications towers 124 whose locations are known or can be determined.

The client devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

FIG. 2 is a block diagram 200 illustrating an example of a client device 110 and server 170 in the architecture 100 of FIG. 1 according to certain aspects of the disclosure.

The client device 110 includes an input device 202, an output device 204, a processor 220, a communications module 222, and memory 240. The input device can be a touchscreen, a keyboard, or any other device to enable a user to supply input to the client device 110. The output device 204 can be a display screen.

The client device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card. The communications module 222 can also be used to establish an information sharing link with the secondary device 120.

The memory 240 includes software instructions 242 and data 244 to enable interaction with the server 170 and/or the secondary device 120. The memory 240 includes a graphical user interface 252 which allows a user to interact with the client device 110. For example, the graphical user interface 252 can receive search queries, and display location information, receive selections, and so on.

The processor 220 of the client device 110 is configured to execute instructions, such as instructions physically coded into the processor 220, instructions read from the memory 240, or a combination of both. As an example, based on the instructions read from the memory 240, the processor can be configured to execute a method for providing a selected location to a secondary device.

Once the instructions from the memory 240 are loaded, the processor 220 is configured to receive, via a graphical user interface (e.g., 252), a search query (e.g., 206) for locations. The processor 220 is further configured to send the search query (e.g., 206) for locations to a server (e.g., 170). The processor 220 is further configured to receive from the server (e.g., 170), for display on the graphical user interface (e.g., 252), one or more locations corresponding to the search query (e.g., 206). The processor 220 is further configured to receive a selection of a location which is selected, via the graphical user interface (e.g., 252), from the one or more locations corresponding to the search query (e.g., 206). The processor 220 is further configured to send to secondary device (e.g., 120), the selected location. The secondary device (e.g., 120) is configured to calculate a route to the selected location.

The server 170 includes a memory 280, a processor 260, and a communications module 262. The memory 280 includes software instructions 282 for storing and/or processing data 284 for providing navigational instructions for a secondary device 120. The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions read from the memory 280, or a combination of both. As an example, the processor 260 of the server 170 executes instructions for providing navigational instructions for a secondary device 120.

The processor 260 is configured to receive from a client device (e.g., 110), which includes a graphical user interface (e.g., 252), a search query for locations (e.g., 206). The processor 260 is configured to perform a search using the search query (e.g., 206) to obtain a location or locations corresponding to the search query (e.g., 206). The processor 260 is configured to send to the client device (e.g., 110), for display on the graphical user interface (e.g., 252), the location or locations corresponding to the search query (e.g., 206). The processor 260 is configured to receive from the client device (e.g., 110), an indication of a selected location which corresponds to one of the locations corresponding to the search query (e.g., 206). The processor 260 is configured to calculate navigation instructions for a secondary device (e.g., 120). The processor 260 is further configured to send to the client device (e.g., 110), the navigation instructions for the secondary device (e.g., 120), and a request to forward the navigation instructions to the secondary device (e.g., 120).

FIG. 3A illustrates an example of a process 300A for providing navigational instructions for a secondary device. Process 300A will be described with reference to FIGS. 1 and 2. However, process 300A is not limited to such systems or configurations, and other systems or configurations may apply. In step 305, the client device 110 receives, via the graphical user interface 252, a search query for locations 206. In steps 310A and 310B, the search query for locations 206 sent by a client device 110 is received by a server 170. The client device includes a graphical user interface 252 to enable a user to prove the search query 206. In step 320, a search using the search query 206 is performed to obtain one or more locations corresponding to the search query for locations 206. In steps 330A and 330B, the one or more locations corresponding to the search query 206 are sent to the client device 110 for display on the graphical user interface 252. In step 340, a selection of a location from the one or more locations corresponding to the search query 206 is received at the client device 110. In steps 350A and 350B, an indication of a selected location which corresponds to one of the location or locations corresponding to the search query 206, is received by the server 170. In step 360, navigation instructions are calculated for a secondary device 120 to navigate to the selected location. In steps 370A and 370B the navigation instructions for the secondary device 120 are sent to the client device 110, along with a request to forward the navigation instructions to the secondary device 120. In steps 380A and 380B, the navigation instructions for the secondary device 120 are received by secondary device 120. The process 300A then ends.

Figure 3B:
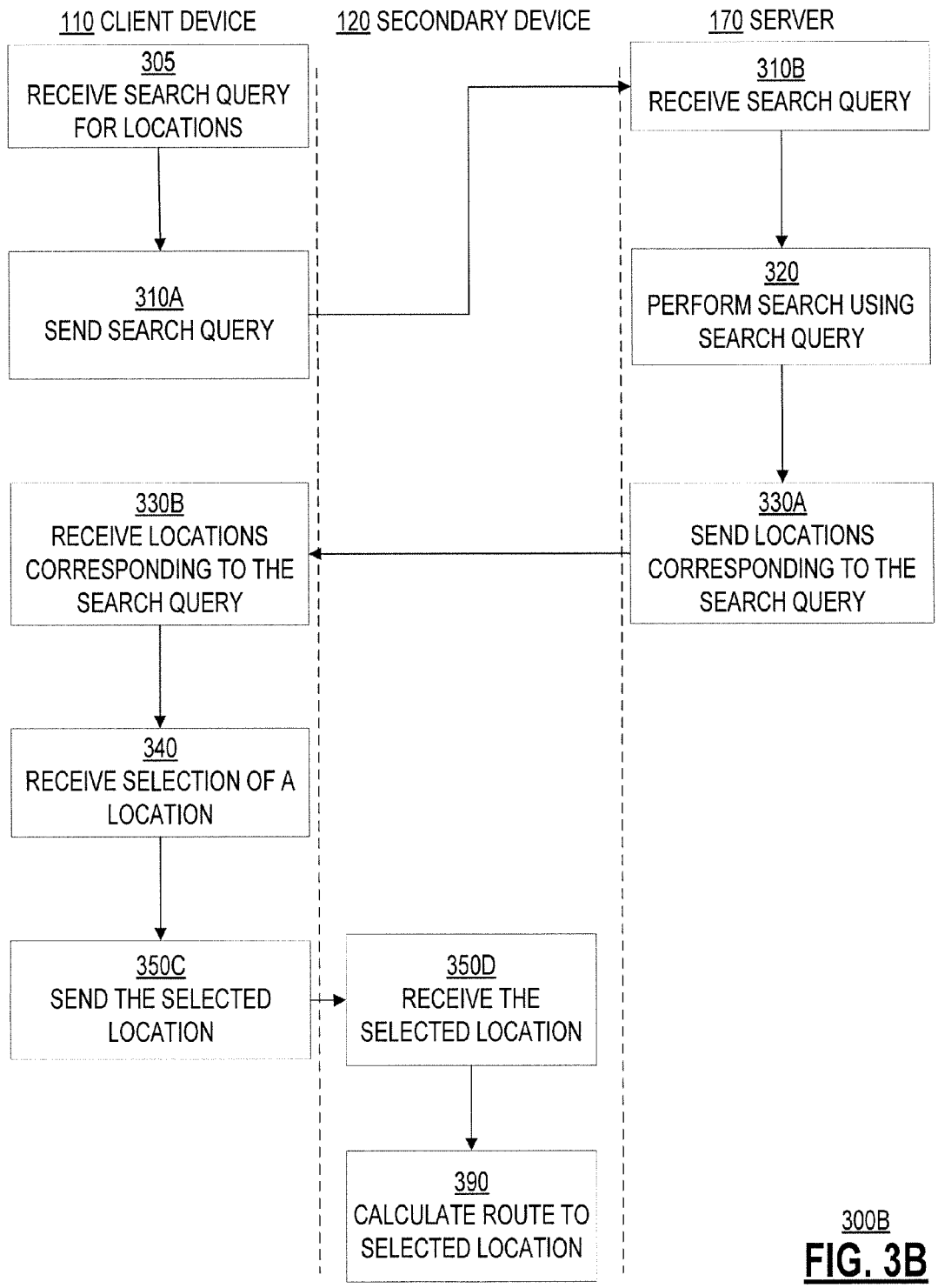
FIG. 3B illustrates an example of a process for providing a selected location to a secondary device.

FIG. 3B illustrates an example of a process 300B for providing a selected location to a secondary device. Process 300B will be described with reference to FIGS. 1 and 2. However, process 300B is not limited to such systems or configurations, and other systems or configurations may apply. In step 305, a client device 110 receives, via a graphical user interface 252, a search query for locations 206. In steps 310A and 310B, the search query for locations 206 is sent by the client device 110 to a server 170. In step 320, a search using the search query 206 is performed to obtain one or more locations corresponding to the search query for locations 206. In steps 330A and 330B, the one or more locations corresponding to the search query 206 are received by the client device 110 for display on the graphical user interface 252. In step 340, a selection of a location from the one or more locations corresponding to the search query 206 is received at the client device 110. The location is selected via the graphical user interface 252. In steps 350C and 350D, the selected location which is selected from the one or more locations corresponding to the search query 206 is sent to the secondary device 120 which is configured to calculate a route to the selected location. In step 390, the secondary device 120 calculates a route to the selected location. The process 300B then ends.

Figure 4:
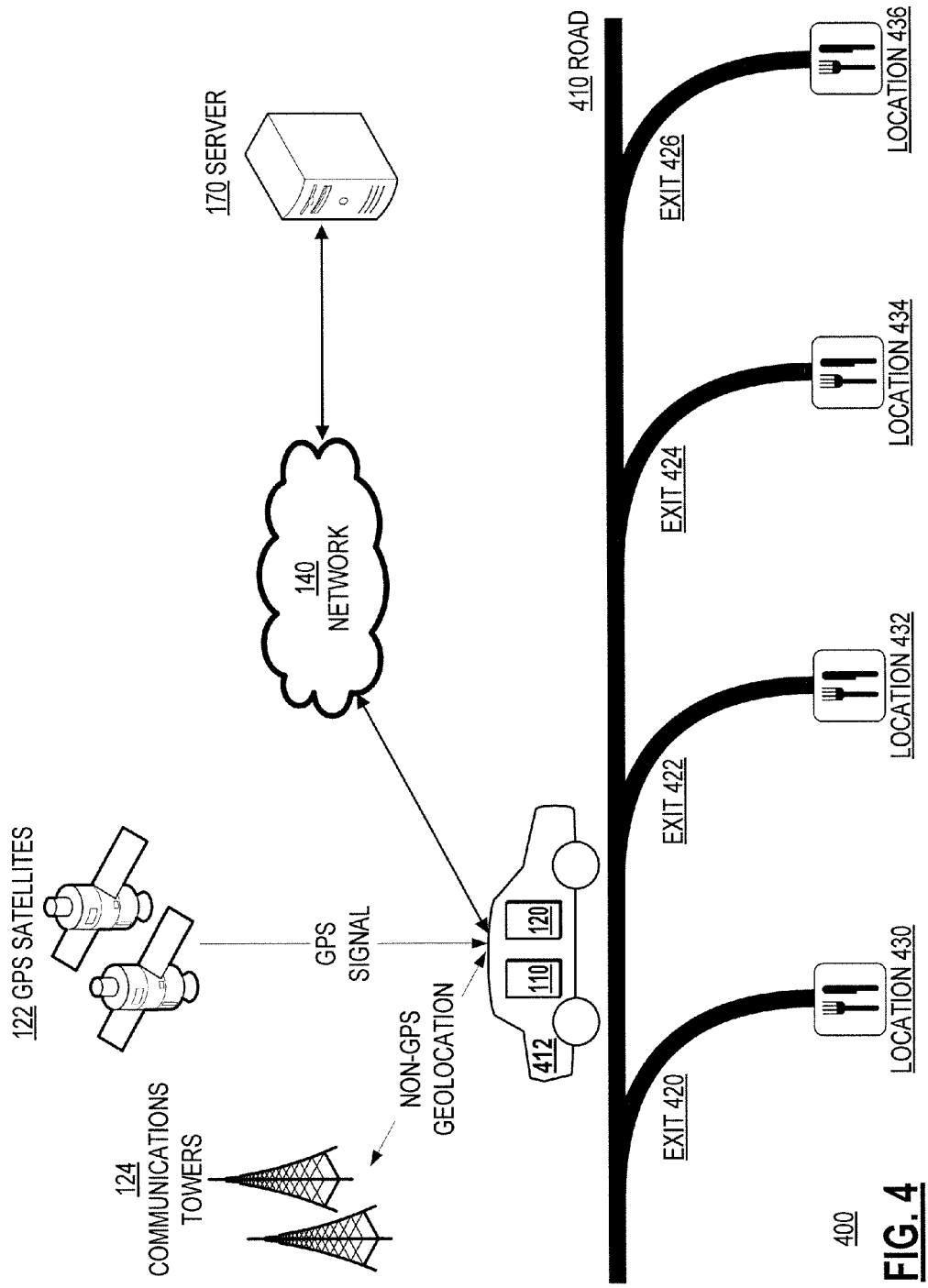
FIG. 4 is an illustration associated with the examples of processes illustrated in FIGS. 3A-3B.

An example will now be described using the examples of the processes 300A and 300B of FIGS. 3A-3B. In these examples, a smartphone will be used as a client device 110 and a GPS navigation system will be used as a secondary device 120. FIG. 4 is an example of an illustration of a car 412 driving along a road 410. The car 412 has a GPS navigation system 120 which is capable of determining its current location via a GPS signal received from GPS satellites 122. In addition to receiving a GPS signal, the GPS navigation system 120 may also be capable of connecting to the network 140.

The process 300A begins when a user (e.g., a passenger) in the car 412 wishes to search for an eatery. In this example, the passenger enters the word "pizza" as a search query 206 on a graphical user interface 252 on the smartphone 110. That is, in step 305, "pizza," the search query 206, is received by the smartphone 110. In steps 310A and 310B, the search query 206 (i.e. "pizza") is received at the server 170. In step 320, a search is performed to obtain a number of locations corresponding to the search query "pizza" 206. In this example, the search yields four pizza restaurants located at Location 430 off Exit 420, Location 432 off Exit 422, Location 434 off 424, and Location 436 off Exit 426. In steps 330A and 330B, the locations 430, 432, 434, and 436 are sent to the smartphone 110 for display on the graphical user interface 252. Upon receiving the locations 430, 432, 434, and 436, the passenger using the smartphone 110 decides that Location 436 offers the type of pizza restaurant he prefers and selects Location 436. In step 340 the selection of Location 436 is received by the smartphone 110. In steps 350A and 350B, Location 436, the selected location, is received by the server 170. In step 360, navigation instructions are calculated for the GPS navigation system 120 to Location 436. In steps 370A and 370B, the navigation instructions for the GPS navigation system 120 are sent to the smartphone 110, along with a request to forward the navigation instructions to the GPS navigation system 120. In steps 380A and 380B, the navigation instructions for the GPS navigation system 120 are received by the GPS navigation system. The process 300A then ends.

Process 300B is similar to process 300A in that steps 305, 310A, 310B, 320, 330A, 330B, and 340 of process 300B are the same as 300A. However, in step 350C of process 300B, the selected location (i.e. Location 436) is sent by the smartphone 110 to the GPS navigation system 120. The GPS navigation system 120 of process 300B is configured to calculate a route to the selected location (i.e. Location 436). In step 390, the GPS navigation system 120 calculates a route to the selected location (i.e. Location 436). The process 300B then ends. It should be noted that while in this example, the selected location is provided to the secondary device 120 by the client 110, the selected location may be provided directly by the server 170 to the secondary device 120.

An information sharing link can be established between the client device 110 and the secondary device 120. The information sharing link may be achieved through a variety of approaches. For example, the information sharing link between the client device 110 and the secondary device 120 may be a wired information sharing link or a wireless information sharing link. As an example, the wired information shared link may include a USB cable. As an example, a wireless information sharing link may be based on BLUETOOTH® ("BLUETOOTH"), Near Field Communication ("NFC"), 802.11, or infrared technology.

The information sharing link may be established based on a "handshake." For example, a shared key may be provided to the client device 110 and/or the secondary device 120 to establish the information sharing link. As an alternative, the information sharing link may be established by physically bringing the client device 110 near to, or in contact with the secondary device 120. That is, the information sharing link may be established by the client device 110 and the secondary device 120 being in proximity to or in direct contact with each other. Using the example of a smartphone as a client device 110, and a GPS navigation system as a secondary device 120, an information sharing link may be established by bringing the smartphone 110 near to or in contact with the GPS navigation system.

The information sharing link may be used to receive from the secondary device 120 at the client device 110, a current navigational status of the secondary device 120. The information sharing link may also be used to send to the secondary device 120 from the client device 110, the navigation instructions for the secondary device 120. The information sharing link may also be used to send a selected location from the client device 110 to the secondary device 120.

Using the example of a smartphone as a client device 110, and a GPS navigation system as a secondary device 120, once an information sharing link has been established between the smartphone 110 and the GPS navigation system 120, the smartphone 110 may receive from the GPS navigation system 120, the current navigational status of the GPS navigation system 120. The current navigational status of the GPS navigation system 120 may include GPS coordinates (e.g., latitude and longitude information of the current location) and/or details about the current navigational route. Details of the current navigational route can include traffic information, duration of the current route, time elapsed during the current route, speed, a destination location, and/or an estimated time of arrival. In short, the current navigational status can be any information that can be received from the secondary device 120, in this case the GPS navigation system 120, and related to the current route, and/or a specific location.

The navigational status of the secondary device 120 may be used to provide context. For example, the navigational status of the secondary device 120 may be used to further optimize the one or more locations provided to the client device 110 as a result of the search query 206. Additional logic may be applied to determine the optimal locations to send to the client device 110 in steps 330A and 330B. For example, as illustrated in FIG. 4, the car 412 is at a location between Exit 420 and Exit 422. That is, the car 412 has passed Exit 420 and is approaching Exit 422. The current location of the car 412 implies that in order to visit a pizza restaurant at Location 430, the car 412 would have to travel in a direction opposite to the current direction of travel. Thus, Location 430 may not be provided to the client device 110 as one of the locations corresponding to the search query 206. The decision to omit Location 430 may be based on the instructions 282 on the server 170, the instructions 242 on the client device 110, or a combination of both. As one example, the server 170 may not include Location 430 in the locations sent to the client device 110 in steps 330A and 330B. As another example, the client device 110 may not display Location 430 even if it is included in the locations corresponding to the search query 206.

As another example of utilizing the current navigational status of the secondary device 120, information related to traffic congestion may be sent to the client device 110. This traffic information may be used to calculate alternate routes to avoid areas with traffic congestion. For example, based on the traffic information, alternate routes may be calculated at the secondary device 120, the client device 110, and/or the server 170. The alternate routes may then be sent to the client device 110 for display on the graphical user interface 252.

It should be noted that a client device 110 may obtain the current navigational status of the secondary device 120 at the outset of any communication to provide context to subsequent interaction between the user, the client device 110, the secondary device 120, and/or the server 170. For example, the navigational status of the secondary device 120 may add context to the searches performed at the client device 110 and/or received at the server 170 from the client device 110. Other examples of interaction include interaction with a map, searches performed at the client device 110, and searches submitted to the server 170 via the client device 110 and/or the secondary device 120.

Figure 5:
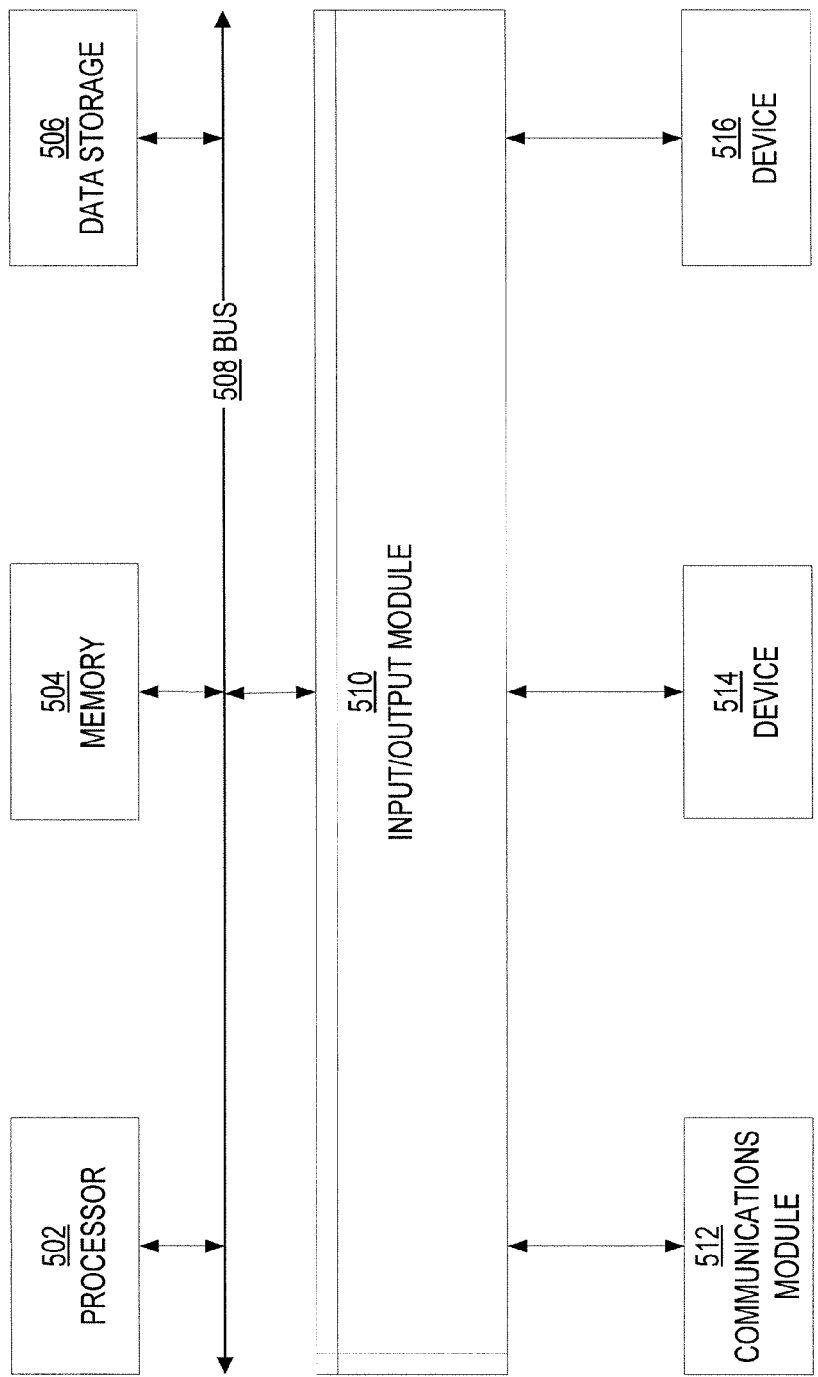
FIG. 5 is a block diagram illustrating an example of a computer system with which some implementations of the subject technology can be implemented.

FIG. 5 is a block diagram illustrating an example of a computer system 500 with which the server 170 and/or the client device 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the server 170 and/or the client device 110) includes a bus 508 or other communication mechanism for communicating information, and a processor 502 (e.g., processor 220 and/or processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240 and or memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client device 110 and/or the server 170 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include client devices and/or servers. A client device and server are generally remote from each other and typically interact through a communication network. The relationship of client device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the disclosed subject matter can also be implemented in combination in a single implementation. Conversely, various features that are described in the context of a single implementation of the disclosed subject matter can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method of providing navigational instructions, the method comprising:
   receiving, by a server, a search query for locations and a navigational status of a secondary device from a client device, wherein the client device is operatively connected to the secondary device via an information sharing link, and wherein the client device includes a graphical user interface, the secondary device corresponding to a location-aware device separate from the client device;
   performing, by the server, a search using the search query and the navigational status of the secondary device to obtain one or more locations corresponding to the search query;
   sending, by the server, the one or more locations corresponding to the search query and the navigational status of the secondary device to the client device for display on the graphical user interface;
   receiving, by the server, an indication of a selected location from the client device, wherein the selected location corresponds to one of the one or more locations corresponding to the search query;
   calculating, by the server, navigation instructions for the secondary device to navigate to the selected location; and
   sending, by the server, the navigational instructions for the secondary device to the client device, and a request for the client device to forward the navigation instructions to the secondary device, wherein the secondary device receives from the client device the navigational instructions via the information sharing link.

2. The computer-implemented method of claim 1, wherein the client device receives from the secondary device, via the information sharing link, a current navigational status of the secondary device.

3. The computer-implemented method of claim 1, wherein the information sharing link is based on a key provided to at least one of the client device or the secondary device.

4. The computer-implemented method of claim 1, wherein the information sharing link is at least one of a wired information sharing link or a wireless information sharing link.

5. The computer-implemented method of claim 4, wherein the wireless information sharing link is based on at least one of BLUETOOTH, Near Field Communication, 802.11, or infrared technology.

6. The computer-implemented method of claim 5, wherein the wireless information sharing link is established by the client device and the secondary device being in proximity to or in direct contact with each other.

7. A non-transitory machine-readable storage medium comprising machine-readable instructions for causing a processor to execute a method of providing navigational instructions, the method comprising:
   receiving a search query for locations and a navigational status of a secondary device from a client device, wherein the client device is operatively connected to the secondary device via at least one of a wired information sharing link or a wireless information sharing link, and wherein the client device includes a graphical user interface, the secondary device corresponding to a location-aware device separate from the client device;
   performing a search using the search query and the navigational status of the secondary device to obtain one or more locations corresponding to the search query;
   sending to the client device, for display on the graphical user interface, the one or more locations corresponding to the search query and the navigational status of the secondary device;
   receiving, from the client device, an indication of a selected location, wherein the selected location corresponds to one of the one or more locations corresponding to the search query;
   calculating navigation instructions for the secondary device to navigate to the selected location; and
   sending, to the client device, the navigation instructions for the secondary device, and a request for the client device to forward the navigation instructions to the secondary device, wherein the secondary device receives from the client device the navigational instructions via the information sharing link.

8. A system for providing navigational instructions, the system comprising:
   a computing device including memory comprising instructions for providing navigational instructions for a secondary device and a processor configured to execute the instructions to:
      receive a search query for locations and a navigational status of the secondary device from a client device, wherein the client device is operatively connected to the secondary device via an information link, and wherein the client device includes a graphical user interface, the secondary device corresponding to a location-aware device separate from the client device;
      perform a search using the search query and the navigational status of the secondary device to obtain one or more locations corresponding to the search query;
      send to the client device, for display on the graphical user interface, the one or more locations corresponding to the search query and the navigational status of the secondary device;
      receive from the client device an indication of a selected location, wherein the selected location corresponds to the one or more locations corresponding the search query;
      calculate navigation instructions for the secondary device to navigate to the selected location; and
      send to the client device the navigation instructions for the secondary device, and a request for the client device to forward the navigation instructions to the secondary device, wherein the secondary device receives from the client device the navigational instructions via the information sharing link.

9. The system of claim 8, wherein the information sharing link is established by providing a key to at least one of the client device or the secondary device.

10. The system of claim 8, wherein the information sharing link is at least one of a wired information sharing link or a wireless information sharing link.

11. The system of claim 10, wherein the wireless information sharing link is based on at least one of a BLUETOOTH, Near Field Communication, 802.11, or infrared technology, and wherein the wireless information sharing link is established by the client device and the secondary device being in proximity to or in direct contact with each other.

12. A computer-implemented method of providing a selected location to a device, the method comprising:
   receiving, by a client device from a secondary device, a navigational status of the secondary device, wherein the navigational status of the secondary device includes at least one of Global Positioning System (GPS) coordinates, traffic information or details about the current navigational route of the secondary device;
   receiving, via a graphical user interface, a search query for locations;
   sending to a server, the search query for locations and the navigational status of the secondary device;
   receiving from the server, for display on the graphical user interface, one or more locations corresponding to the search query and the navigational status of the secondary device;
   receiving a selection of a selected location, wherein the selected location is selected via the graphical user interface from the one or more locations corresponding to the search query and the navigational status of the secondary device; and
   sending to the secondary device the selected location, wherein the secondary device is configured to calculate a route to the selected location.

13. The computer-implemented method of claim 12, further comprising:
   establishing an information sharing link between the client device and the secondary device;
   receiving, from the secondary device at the client device via the information sharing link, the current navigational status of the secondary device; and
   sending to the secondary device via the information sharing link the selected location.

14. The computer-implemented method of claim 13, wherein the information sharing link is at least one of a wired information sharing link or a wireless information sharing link.

15. The computer-implemented method of claim 14, wherein the wireless information sharing link is based on at least one of BLUETOOTH, Near Field Communication, 802.11, or infrared technology.

16. The computer-implemented method of claim 15, wherein the information sharing link is established by the client device and the secondary device being in proximity to or in direct contact with each other.

17. The computer-implemented method of claim 13, wherein the information sharing link is based on a key provided to at least one of the client device or the secondary device.

18. A non-transitory machine-readable storage medium comprising machine-readable instructions for causing one or more processors to execute a method for providing a selected location to a device, the method comprising:
   receiving, from a secondary device, a navigational status of the secondary device, wherein the navigational status of the secondary device includes at least one of Global Positioning System (GPS) coordinates, traffic information or details about the current navigational route of the secondary device;

receiving, via a graphical user interface, a search query for locations;

sending to a server, the search query for locations and the navigational status of the secondary device;

receiving from the server, for display on the graphical user interface, one or more locations corresponding to the search query and the navigational status of the secondary device;

receiving a selection of a selected location, wherein the selected location is selected via the graphical user interface from the one or more locations corresponding to the search query; and sending to the secondary device, via at least one of a wired information sharing link or a wireless information sharing link, the selected location, wherein the secondary device is configured to calculate a route to the selected location.

19. A system for providing a selected location to a secondary device, the system comprising:

a computing device including memory comprising instructions for providing a selected location to a secondary device and a processor configured to execute the instructions to:

receive, from the secondary device, a navigational status of the secondary device, wherein the navigational status of the secondary device includes at least one of Global Positioning System (GPS) coordinates, traffic information or details about the current navigational route of the secondary device;

receive, via a graphical user interface, a search query for locations;

send to a server, the search query for locations and the navigational status of the secondary device;

receive from the server, for display on the graphical user interface, one or more locations corresponding to the search query and the navigational status of the secondary device;

receive a selection of a selected location, wherein the selected location is selected, via the graphical user interface, from the one or more locations corresponding to the search query; and send to the secondary device, via an information sharing link, the selected location, wherein the secondary device is configured to calculate a route to the selected location.

* * * * *